United States Patent [19]

Evans

[11] Patent Number: 5,257,535

[45] Date of Patent: Nov. 2, 1993

[54] STEM STRESS MEASURING INSTRUMENT FOR VALVE OPERATING SYSTEM

[75] Inventor: Richard F. Evans, Atlanta, Ga.

[73] Assignee: Westinghouse Electric Corp., Pittsburgh, Pa.

[21] Appl. No.: 945,457

[22] Filed: Sep. 16, 1992

[51] Int. Cl.⁵ .......................................... G01M 19/00
[52] U.S. Cl. ..................................... 73/168; 73/862.29
[58] Field of Search ................ 73/168, 862.29, 862.31, 73/862.541; 137/551

[56] References Cited

U.S. PATENT DOCUMENTS

| | | | |
|---|---|---|---|
| 4,089,216 | 5/1978 | Elias | 73/862.31 |
| 4,542,649 | 9/1985 | Charbonneau et al. | 73/168 |
| 4,570,903 | 2/1986 | Crass | 251/229.12 |
| 4,660,416 | 4/1987 | Charbonneau et al. | 73/862.31 |
| 4,693,113 | 9/1987 | McNennamy et al. | 73/168 |
| 4,759,224 | 7/1988 | Charbonneau et al. | 73/862.31 |
| 4,831,873 | 5/1989 | Charbonneau et al. | 73/168 |
| 4,856,327 | 8/1989 | Branam et al. | 73/168 |
| 4,860,596 | 8/1989 | Charbonneau et al. | 73/862.31 |
| 4,869,102 | 9/1989 | Hale et al. | 73/168 |
| 4,891,975 | 1/1990 | Charbonneau et al. | 73/168 |
| 4,912,984 | 4/1990 | McMennamy et al. | 73/862.65 |
| 5,000,040 | 3/1991 | Charbonneau et al. | 73/168 |
| 5,056,374 | 10/1991 | McMennamy et al. | 73/862.65 |
| 5,140,853 | 8/1992 | Branam et al. | 73/168 |

Primary Examiner—William A. Cuchlinski, Jr.
Assistant Examiner—G. Bradley Bennett
Attorney, Agent, or Firm—Michael G. Panian

[57] ABSTRACT

A valve stem stress measuring instrument is provided for measuring axial thrust developed on a valve operating system. In a quarter turn valve, or a butterfly, a valve stem stress instrument comprises a pair of load sensing assemblies which are disposed on either end of the valve housing. One load sensing assembly is attached to the stop nut end of the valve housing and a second load sensing assembly is installed on the drive end portion of the housing. Load cells are disposed between the worm shaft and a fixed engagement area rigidly attached to the worm shaft housing. With the worm shaft captured between each of the load sensing assemblies, reaction thrust or stem stress can be determined on the shaft in both the open and closed positions. After calibration, the present invention provides means for determining stem torsional stress values for a butterfly valve over its full stroke, such that the valve can be tested under actual operating conditions.

15 Claims, 5 Drawing Sheets

STEM STRESS MEASURING INSTRUMENT FOR VALVE OPERATING SYSTEM

TECHNICAL FIELD

The invention relates generally to the field of testing and analysis of valve operating systems, and more particularly to an instrument and method for measuring valve stem stress over the full stroke operation of butterfly valves.

BACKGROUND OF THE INVENTION

In recent years, the need has arisen to monitor certain operating conditions of valve operating systems, specifically in terms of motor operated valves. Such parameters to be measured, for example, are torque on a rotating valve stem, motor power and current output, and valve axial thrust or stress. Although these parameters are desired to be measured on valves, different valve and valve operator configurations require different testing equipment for each of the various type valves. Examples of motor operated valve systems are rotating and nonrotating rising stem valves, air operated valves, and quarter turn or butterfly valves.

A torque measuring apparatus for a valve operating system, in particular a butterfly valve, is disclosed in U.S. Pat. No. 4,787,245 to Anderson et al., the disclosure of which is incorporated herein by reference. An apparatus for monitoring, measuring and recording rotational forces and torque within a valve actuator comprises a load cell supported between two arm members. One arm member is mounted stationary to the housing of the valve actuator and the other arm is interfaced for rotation with a worm gear within the actuator. The connection between the two arm members, through a load cell, results in the blocked rotation of the worm gear and the development of torque within the actuator, which torque is monitored through the measurement of the rotational force at the load cell and knowledge of the moment arm of the force at the load cell. A time related trace of the torque is provided in comparison and correlation is made to the time traces of other system parameters. The apparatus is attached to the butterfly valve by removing the upper bearing cap and attaching the apparatus to the gear box. The operation of the apparatus is such that a counter rotational force is developed at the load cell from the torque generated in the valve actuator over a period of time, as a result of preventing rotation of the worm gear. The output from the load cell is traced electronically and displayed and are recorded on an analytical device such as an oscilloscope. The apparatus of the '245 patent operates in such a way that the counter rotational force, which resists rotation of the movable torque arm, operates to resist rotation of the worm gear to develop a torque within the valve operating system.

The worm shaft of a butterfly valve is mounted within the housing by means of a pair of radial bearings disposed on the shaft on opposite sides of the worm. These bearings rotationally mount the shaft within the housing. Although these bearings provide the required radial support for the shaft, it has recently been discovered that these bearings experience significant axial thrust loading during operation of the butterfly valve. It has also been discovered that the axial loading on these bearings exceeds the thrust design rating for the radial bearings. This has resulted in extensive repair and replacement of the radial bearings in prior art butterfly valve operating systems.

What is needed then is a device to measure axial thrust on the radial bearings in a butterfly valve which would typically be experienced under normal operating conditions. It is therefore an object of the present invention to provide a method and apparatus for measuring the axial thrust or stress developed on a valve operating system.

It is a further object of the present invention to provide a calibrated apparatus and method for determining the stress developed on a butterfly valve stem over the full stroke of its operation.

It is still a further object of the present invention to test butterfly valves under differential pressure, or actual operating, conditions to evaluate the overall performance of the valve.

SUMMARY OF THE INVENTION

The above objects are obtained by the present invention, according to which, briefly stated a method of determining the thrust developed on a worm shaft is provided. The worm shaft drives a worm gear in rotation within a valve actuator housing about an axis of rotation, the worm shaft being rotatably mounted within the housing by a pair of bearings disposed on opposite ends of the worm shaft. Means for rotating the worm shaft is provided. The method comprises the steps of first disposing a first load cell on one end of the worm shaft, the first load cell operable to sense operating loads on the worm shaft when rotated in a first direction. A second load cell is disposed on the opposite end of the worm shaft, the second load cell being operable to sense operating loads on the worm shaft when rotated in a second direction. The worm shaft is then rotated in the first direction to a first stop position to thereby place the first load on the worm shaft, while sensing the first load with the first load cell to provide a first load output. The worm shaft is then rotated in the second direction to a second stop position to place the second load on the worm shaft, and sensing the second load with the second load cell to provide a second load output. The outputs of the first and second load cells are then analyzed to determine the axial thrust developed on the worm shaft during operating conditions.

BRIEF DESCRIPTION OF THE DRAWINGS

Various other objects, features, and advantages of the invention will become more apparent by reading the following detailed description in conjunction with the drawings, which is shown by way of example only, wherein.

DESCRIPTION OF THE PREFERRED EMBODIMENTS

Figure 1:
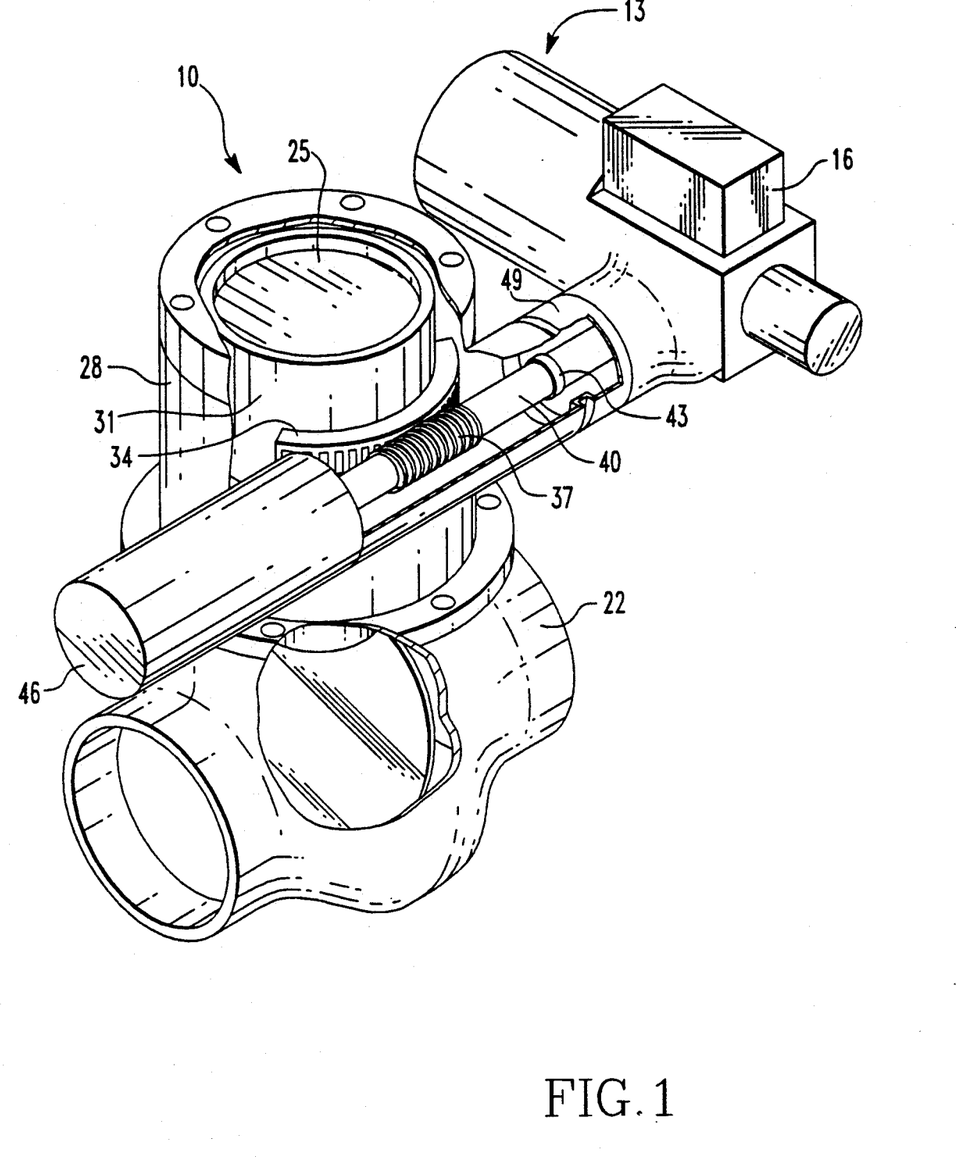
FIG. 1 is an isometric view of a typical valve operating system such as a butterfly valve.

Referring now to the drawings in detail, wherein like numerals refer to similar components throughout the various drawings, FIG. 1 shows an isometric view of a typical valve operating system, and in particular, a quarter turn butterfly valve 10. A valve actuator 13 is driven by a motor operated valve operator 16, or a hand wheel 19. The valve operating system is mounted to a valve housing 22 within a fluid conduit network (not shown). The valve operating system comprises a worm gear 25 mounted for rotation within a gear box 28. The worm gear includes a cylindrical shaft portion 31 and a gear plate 34, the worm gear being mounted within the gear box for rotation about the longitudinal axis of the shaft portion. The shaft of the valve 10 includes a cylindrical sleeve element (not shown) which is splined to the inner wall of the worm gear. The inner periphery of the worm gear is keyed to accept the stem nut or valve stem, such that the valve stem rotates with the worm gear.

In a typical butterfly valve 10, the worm gear includes a tapered configuration of a typical gear plate. The gear plate comprises a circular segment which includes an arc shaped row of gear teeth along its outer periphery and the tapered segment. The tapered segment defines tapered edges in an arcuate edge. The row of gear teeth is in driven engagement with the worm 37, which worm is driven by a worm shaft 40. the worm shaft is mounted for rotation by a pair of radial bearings 43 (one of which is shown in the figure) disposed on either side of the worm. In the butterfly valve 10 shown, the row of gear teeth of the worm gear extends about a sufficient distance of the outer periphery of the circular segment to allow for a quarter turn actuation of the valve disk.

On one end of the worm shaft is a stop nut housing 46 designed to prevent over rotation of the worm shaft 40 by the actuator 13. The other end of the worm shaft is connected to the operator 13 by a drive sleeve cap 46. In order to attach the apparatus of the present invention, a pair of fixtures are attached to the butterfly operator in place of the stop nut housing and the drive sleeve cap.

Figure 2:
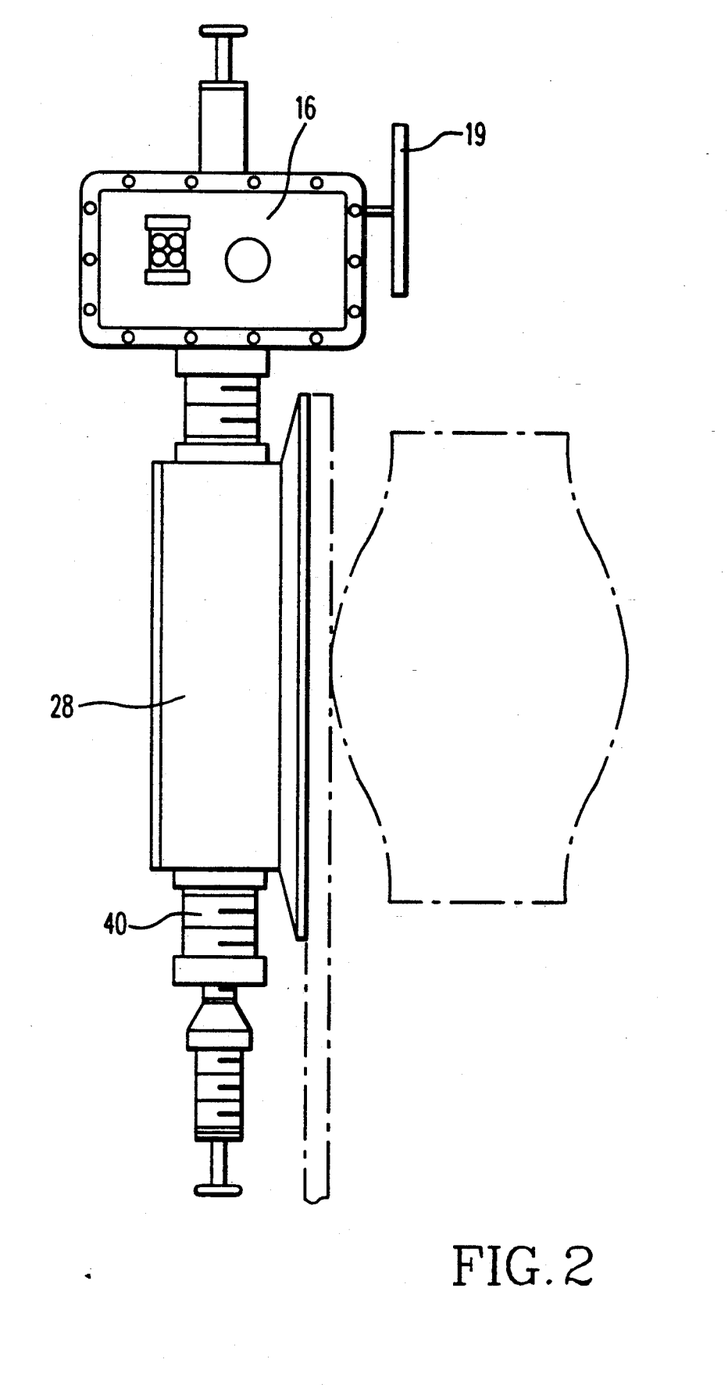
FIG. 2 is a view of a butterfly valve having the apparatus of the present invention mounted thereon.
Figure 3:
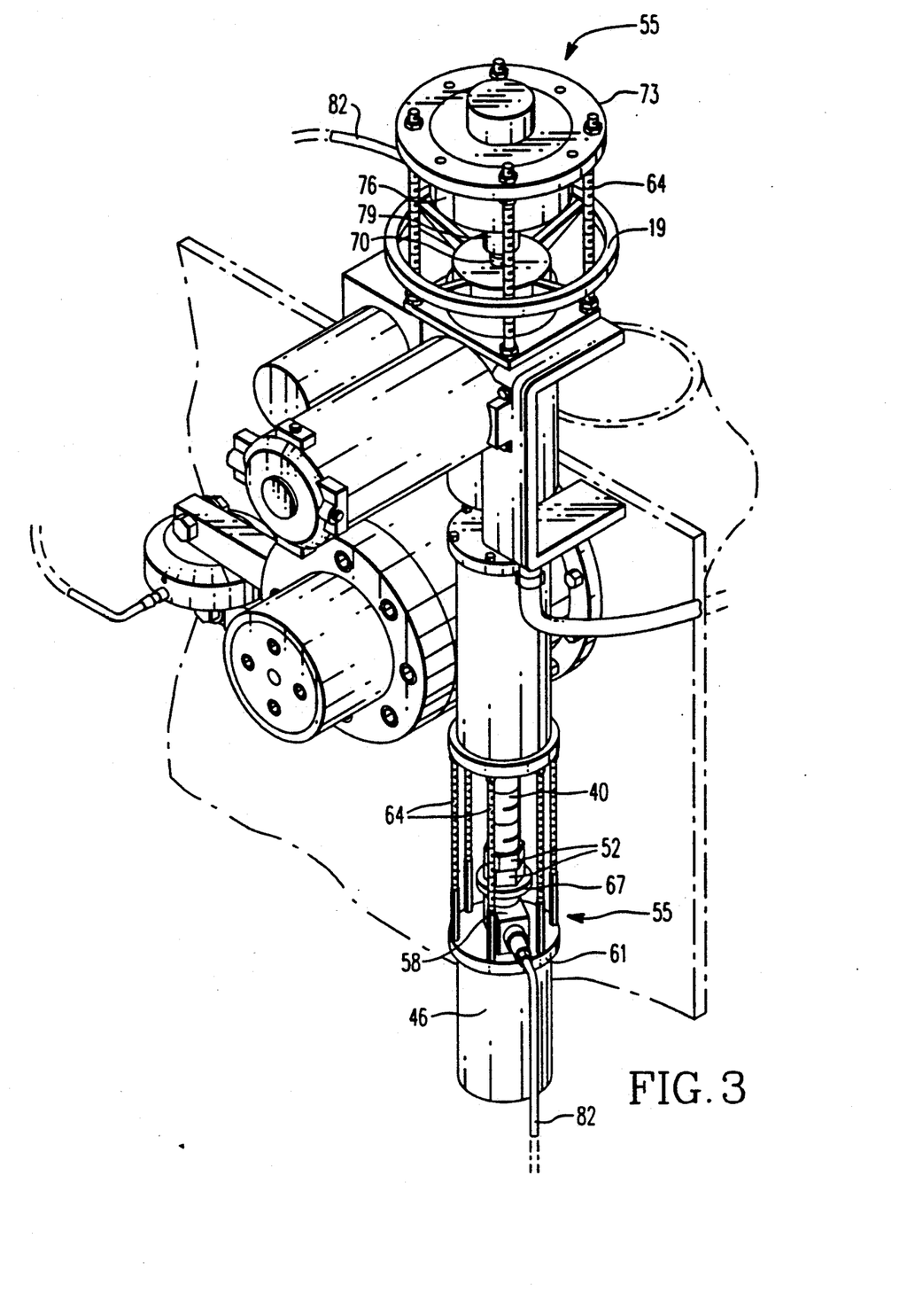
FIG. 3 is a view one embodiment of the apparatus attached to a butterfly valve test stand, representing a method of calibrating the present invention.
Figure 4:
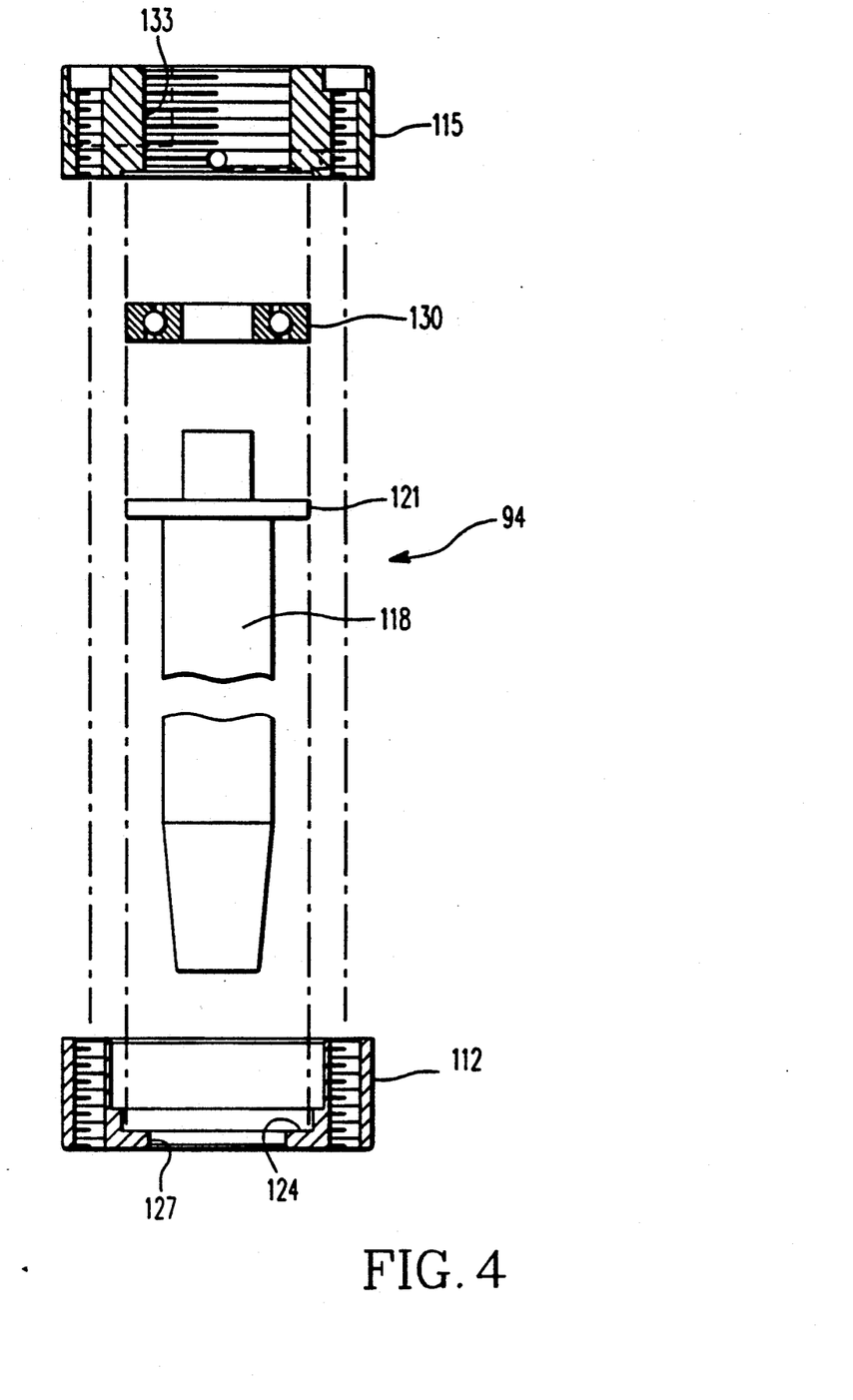
FIG. 4 is a view of a preferred embodiment of the present invention.

Referring now to FIGS. 2 through 4, the apparatus and method of the present invention will be disclosed in more particular detail. The stop nut housing cover 46 is removed to expose the stop nuts 52, a record of their positions being noted. The stop nuts in the housing may then removed. A load sensing assembly 55 is installed on the one end of the butterfly valve housing. The load sensing assembly comprises an axial load cell 58 which is mounted onto a plate 61, the plate being secured to the housing by a plurality of extension bolts 64 which bolt the plate to the housing using the existing bolt holes in the butterfly valve housing. Between the load cell 58 attached to the plate and the worm shaft 40 is disposed a radial/thrust reaction bearing 67 which operates to transfer the thrust from the worm shaft to the load cell. On the opposite end of the housing, i.e., in the area where the operator is secured to the worm shaft, the operator being a motor operator 16 and/or a hand wheel 19, is mounted a second load sensing assembly 55. In the configuration shown in FIG. 3, wherein the hand wheel of the operator is on the same longitudinal axis as the worm shaft, an adapter 70 is provided to take into consideration the clearance required for the hand wheel 19. Similar to the load sensing assembly secured to the opposite end of the worm shaft 40 on the housing, the second load sensing assembly comprises a plate 73 secured to the housing and offset therefrom by four extension bolts 64. A second axial load cell 76 is secured to the plate and a second radial/thrust reaction bearing 79 is disposed between the worm shaft and the second load cell. For both the first and second load cells, outputs 82 are provided from the load cells to a computer controlled sensing device (not shown) which takes the analog outputs from the load cells and converts them to digital readings corresponding to the actual stem torque or stress developed on the worm shaft 40 during operation.

As shown in the FIG. 3, the first load sensing assembly (oriented in the bottom of the figure) is used to sense the axial thrust developed on the worm shaft as the butterfly valve 10 is being opened. Conversely, the second assembly mounted at the top of the housing is used to sense the force developed on the worm shaft in the closed position. Thus the apparatus of the present invention can monitor axial thrust or stem stress developed on the worm shaft 40 throughout the complete valve cycle.

In the most preferred embodiment (FIG. 4), the load sensing assemblies are comprised of an apparatus referred to as a quickly installed load measuring apparatus 85. This system is the subject of U.S. Pat. Nos. 4,912,984 and 5,056,374 which are assigned to the present assignee hereunder. The '984 and '374 patents are hereby incorporated herein by reference. The load measuring apparatus comprises a ready-to-use, portable assembly having a load bearing body 88 providing a deformable link between the butterfly shaft housing 22 and the worm shaft 40 which moves relative to the housing. The deformable load bearing body functions as a support for a shaft engaging element 91 of the load measuring device. Strain gages (not shown) measure the deformation of the load bearing body 88 which deformation is related to the thrust of the worm shaft. The quickly installed load measuring apparatus 85 has a threaded pin portion which, through the axial position bearing cap 94 (FIG. 5) engages the top of the threaded portion of the worm shaft housing of the butterfly valve 10. The quickly installed load measuring apparatus has a stem comprised of an elongated threaded rod 97 and a head 100 which is held to the rod by a set screw (not shown). The threaded rod passes through a stop washer 103 having a central passage through which the rod 97 but not the head 100 can pass. The outer periphery of the stop washer is threaded for threaded engagement with the upper wall segment of the load measuring device housing 88. The threaded rod passes through the housing of the measuring device and the load measuring portion to a bottom portion having internal and external 106 threads.

The shaft 97 of the quickly installed load measuring apparatus 85 is adapted to engage the worm shaft 40 of the butterfly valve 10. A radial/thrust bearing 109 is disposed between axial position bearing cap 94 the shaft of the quickly installed load measuring apparatus and the worm shaft of the butterfly valve. In the area where the quickly installed load measuring apparatus is attached to the butterfly valve housing where the hand wheel 19 is located, the axial position bearing cap is necessary to mount the system relative to the hand wheel. This bearing cap is shown in detail in FIG. 5.

Figure 5:
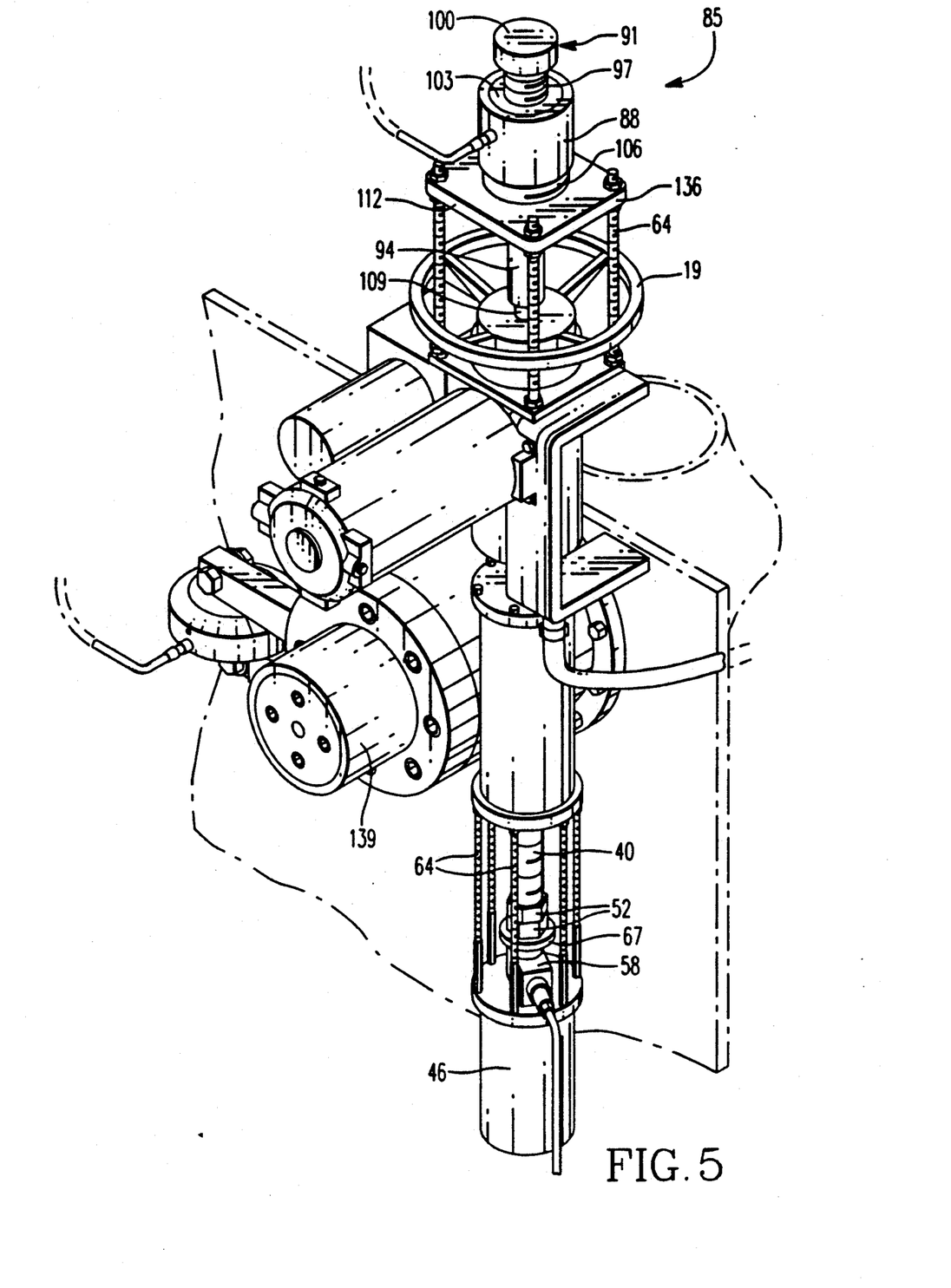
FIG. 5 is an exploded view of an axial position bearing cap utilized with one embodiment of the present invention.

Various components of the axial positioning bearing cap assembly 94 are a bearing housing 112, adapter nut 115, and reaction rod 118. The reaction rod has an upper collar 121 adapted to mate within a groove 124 in the bearing housing. The bearing housing also includes a second groove area 127 to provide a seal between the bearing housing and the butterfly valve housing. After the reaction rod is inserted into the bearing housing, a ball thrust bearing 130 is inserted onto the top of the reaction rod 118 resting on the collar. The adapter nut 115 is then installed on top of the bearing housing to capture the reaction rod and bearing therein and the adapter nut is bolted to the bearing housing. The adapter nut has an internally threaded portion 133 which is configured to engage the bottom of the threaded shaft 97 of the quickly installed load measuring apparatus 85. The reaction rod 118 is required to span the distance between the hand wheel 19 and the top of the butterfly valve operator housing. When the quickly installed load measuring apparatus is secured to the worm shaft 40 housing of the butterfly valve 10, the threaded rod of the load measuring apparatus is rotated so that the worm shaft of the butterfly valve is captured between the load measuring apparatus, with the axial thrust bearings being located between the shafts. The externally threaded lower portion 106 of the quickly installed load measuring apparatus is threaded into a plate 136 mounted above the hand wheel by extension rods 64.

The method of the present invention will now be discussed in detail. With the stop nut housing cover and the drive sleeve removed from the butterfly valve, the quickly installed load measuring apparatus 85 are ready to be installed. With a load measuring apparatus threaded into the plate 136 and an axial positioning bearing cap 94 threaded onto its shaft 97, the stem extension 91 is screwed inward until it touches the worm shaft 40, the stem extension being rotated inward by the threaded rod on the load measuring apparatus. After engagement with the worm shaft, the stem extension is rotated back a half turn. Preferably, a bearing is disposed between the shafts to prevent damage during testing. The hand wheel 19 on the valve 10 is then rotated in the closed direction until a physical stop is felt. It is desired to thus "lock" the worm shaft and the end bearings outward, i.e, away from the operator adapter, allowing the second load cell to sense open loads. The second load sensing assembly is then assembled by placing the second axial positioning bearing cap onto the second load measuring apparatus. The load sensing apparatus is then mounted into the upper bearing housing, its threaded rod is then screwed inward until the stem extension touches the worm shaft 40. With both load sensing assemblies installed on the operator housing, final adjustments are made to insure that both load cell stems are tight against the worm shaft.

In order to calibrate the load sensing assemblies, the torque measuring apparatus 139 disclosed in U.S. Pat. No. 4,787,245 is installed on the butterfly valve housing. Reference is made to the specification and description of the '245 patent for the method of installation of the torque measuring apparatus. A butterfly valve is then tested according to the method of the '245 patent. The valve 10 is operated in both the open and closed position to calibrate both load sensing apparatus. As the butterfly valve is operated, the output from the first load sensing apparatus is read to determine the reaction force generated in the worm shaft. First the valve is tested in the closed position, the output of the torque measuring apparatus being used to calibrate the first load or thrust sensing assembly in the closed position. When the first load sensing apparatus is calibrated, the operator is then caused to moved the butterfly valve 10 in the open position to similarly calibrate the second load sensing assembly. After the load sensing assemblies have been calibrated, the torque measuring apparatus 139 is removed from the butterfly valve.

With the butterfly valve now able to completely operate between the open and closed positions, the butterfly valve stem stress can be monitored using the method of the present invention. Preferably, the butterfly valve 10 is operated with water flow in the piping system so as to test the butterfly valve under actual operating, or differential pressure, conditions. With the valve initially closed, the operator 13 is actuated to cause the valve to open, the thrust developed on the worm shaft 40 being sensed by the load sensing assemblies 55,85 until the butterfly valve is completely open. The operator is then reversed to close the valve and the thrust or stress developed on the worm shaft is monitored as the valve is caused to close against the pressure of the water flowing through the piping system. Thus a butterfly valve 10 is able to be monitored through its full stroke under actual operating differential pressure testing conditions that exist during normal valve operation.

In this manner, the thrust that is developed on the radial bearings 43 installed within the worm shaft housing 46 on the worm shaft 40 can be determined. Differential pressure testing determines the reaction force developed on the worm shaft during opening/closing of the butterfly valve 10 during actual operating conditions. This lets the power plant owner determine actual stem torsional stress values under actual water flow conditions. Thus if the thrust developed on the worm shaft 40 exceeds the ratings of the bearings, the bearings can be replaced in a timely fashion without failure of the butterfly valve.

While specific embodiments of the invention have been described in detail, it will be appreciated by those skilled in the art that various modifications and alterations would be developed in light of the overall teachings of the disclosure. Accordingly, particular arrangements disclosed are meant to be illustrative only and not limiting as to the scope of the invention which is to be given the full breadth of the appended claims and in any and all equivalents thereof.

I claim:

1. In a valve which includes a worm shaft which drives a worm gear in rotation within a valve actuator housing about an axis of rotation, the worm shaft being rotatably mounted within the housing by a pair of bearings disposed on opposite ends of the worm shaft and further including means for rotating the worm shaft, a method of determining the thrust developed on the worm shaft comprising the steps of:

a. disposing a first load sensing assembly on one end of the worm shaft, the first load sensing assembly operable to sense operating loads on the worm shaft when rotated in a first direction;

b. disposing a second load sensing assembly on the opposite end of the worm shaft, the second load sensing assembly operable to sense operating loads on the worm shaft when rotated in a second direction;

c. rotating the worm shaft in the first direction to a first stop position to thereby place a first load on the worm shaft, and sensing said first load with the first load sensing assembly to provide a first load output;

d. rotating the worm shaft in the second direction to a second stop position to thereby place a second load on the worm shaft, and sensing said second load with the second load sensing assembly to provide a second load output; and e. analyzing said first and second load outputs to determine the thrust developed on the worm shaft.

2. The method as recited in claim 1, wherein step c. comprises rotating the worm shaft in a valve open direction.

3. The method as recited in claim 1, wherein step d. comprises rotating the worm shaft in a valve closed direction.

4. The method as recited in claim 2, wherein step d. comprises rotating the worm shaft in a valve closed direction.

5. A stem thrust measuring apparatus for measuring the thrust developed in a valve operating system which includes a worm shaft which drives a worm gear in rotation within a valve operator housing about an axis of rotation, the worm shaft being rotatably mounted within the housing by a pair of bearings disposed on opposite ends of the worm shaft and further including means for rotating the worm shaft, the stem thrust measuring apparatus comprising:

a. a first load sensing means disposed on one end of the worm shaft, said first load sensing means operable to sense operating loads on the worm shaft when rotated in a first direction;

b. a second load sensing means on the opposite end of the worm shaft, said second load sensing means operable to sense operating loads on the worm shaft when rotated in a second direction; and c. said first and second load sensing means each include means for providing outputs therefrom, said outputs being indicative of the thrust developed on the worm shaft.

6. The stem thrust measuring apparatus as recited in claim 5, wherein said first load sensing means further comprises a first load cell for providing an output which is indicative of the thrust developed on the worm shaft in a valve opening direction, and said second load sensing means further comprises a second load cell for providing an output which is indicative of the thrust developed on the worm shaft in a valve closing direction.

7. In a valve Which includes a worm shaft which drives a worm gear in rotation within a valve actuator housing about an axis of rotation, the worm shaft being rotatably mounted within the housing by a pair of bearings disposed on opposite ends of the worm shaft and further including means for rotating the worm shaft, the worm gear being in driving communication with a valve stem to rotate the valve stem in opening and closing directions so as to control the flow of a fluid therethrough, a method of determining valve stem stress comprising the steps of:

a. disposing a first sensor assembly on one end of the worm shaft, the first sensor assembly operable to provide an output indicative of the valve stem stress when rotated in the opening direction;

b. disposing a second sensor assembly on an opposite end of the worm shaft, the second sensor assembly operable to provide an output indicative of the valve stem stress when rotated in the closing direction;

c. operating the valve in the opening direction to permit the flow of fluid therethrough to provide a first output from the first sensor assembly;

d. operating the valve in the closing direction to restrict the flow of fluid therethrough to provide a second output from the second sensor assembly; and e. analyzing said first and second outputs to determine the stress developed on the valve stem.

8. The method as recited in claim 7, wherein the first output from the first sensor assembly is indicative of a thrust developed on the worm shaft in reaction to the valve stem stress in the opening direction, and the second output from the second sensor assembly is indicative of a thrust developed on the worm shaft in reaction to the valve stem stress in the closing direction.

9. The method as recited in claim 7, further comprising the step of the valve over a period of time and recording said first and second outputs.

10. The method as recited in claim 9, further comprising the step of comparing later recorded first and second outputs with previously recorded outputs to determine the operating condition of the valve.

11. In a valve which includes a worm shaft which drives a worm gear in rotation within a valve actuator housing about an axis of rotation, the worm shaft being rotatably mounted within the housing by a pair of bearings disposed on opposite ends of the worm shaft and further including means for rotating the worm shaft, the worm gear being in driving communication with a valve stem to rotate the valve stem in opening and closing directions so as to control the flow of a fluid therethrough, a valve stem stress monitor comprising:

i. a first sensor assembly disposed on one end of the worm shaft, the first sensor assembly operable to provide an output indicative of the valve stem stress when the valve is operated in the opening direction to permit the flow of fluid therethrough;

ii. a second sensor assembly disposed on an opposite end of the worm shaft, the second sensor assembly operable to provide an output indicative of the valve stem stress when the valve is operated in the closing direction to restrict the flow of fluid therethrough; and iii. means for displaying and recording said first and second outputs indicative of the stress developed on the valve stem.

12. The valve stem stress monitor as recited in claim 11, wherein each of said first and second sensor assemblies comprises a load cell operably connected to opposite ends of the worm shaft, the first output being indicative of a first load developed on the worm shaft in reaction to the valve stem stress when the valve is operated in the opening direction, and the second output being indicative of a second load developed on the worm shaft in reaction to the valve stem stress when the valve is operated in the closing direction.

13. The valve stem stress monitor as recited in claim 11, wherein the first sensor assembly comprises a first radial bearing disposed between a first load cell and the worm shaft, the first load cell providing an output indicative of a reaction thrust developed on the worm shaft when the valve is operated in the opening direction.

14. The valve stem stress monitor as recited in claim 11, wherein the second sensor assembly comprises a second radial bearing disposed between a second load cell and the worm shaft, the second load cell providing an output indicative of a reaction thrust developed on the worm shaft when the valve is operated in the closing direction.

15. The valve stem stress monitor as recited in claim 11, wherein the first sensor assembly comprises a first radial bearing disposed between a first load cell and one end the worm shaft, the first load cell providing an output indicative of a reaction thrust developed on the worm shaft when the valve is operated in the opening direction, and the second sensor assembly comprises a second radial bearing disposed between a second load cell and an opposite end of the worm shaft, the second load cell providing an output indicative of a reaction thrust developed on the worm shaft when the valve is operated in the closing direction.

* * * * *